Patented Sept. 21, 1943

2,330,084

UNITED STATES PATENT OFFICE 2,330,084

FIBER-RUBBER COMPOSITION

Walter Scott, Philadelphia, Pa.

No Drawing. Application June 8, 1939,
Serial No. 278,077

3 Claims. (Cl. 92—21)

This invention relates to an improved process for making material composed of leather and rubber in combination.

Various processes have heretofore been proposed utilizing waste leather and latex to form a leather-rubber material. These processes have not proved altogether satisfactory, the principal difficulties being in the permanent combining of the rubber from the latex with the leather, and in obtaining uniform distribution of the rubber and its accessories. In the processes heretofore employed, an inherent difficulty has been that the bond between the leather and the rubber has not been sufficiently strong in the finished product.

A further difficulty has been that the latex has shown a tendency to form irregular particles of rubber, causing non-uniformity in the finished product.

A still further difficulty has been the irregular dispersion of other materials which may be added to the mass and which results in their irregular distribution in the finished product.

A still further difficulty has been the partial or incomplete vulcanization of the rubber in the finished product.

Processes of this general nature are shown in U. S. Letters Patent No. 1,827,356, dated October 13, 1931, to Antonio Ferretti, and U. S. Letters Patent No. 2,112,517, dated March 29, 1938, to Donald E. Cable.

Therefore, one object of the present invention is to provide a process for making a material composed of leather and rubber in combination, in which the rubber adheres strongly to the leather particles.

A further object is to provide a process for making a material composed of leather and rubber characterized by uniformity of the finished product.

A still further object is to produce a material comprising leather and rubber in a uniform combination in which the adherence between the constituents is high and which is capable of being made at a relatively small cost.

A still further object is to make a material comprising leather in combination in which the rubber in the finished product is satisfactorily cured.

Most of the latex used at the present time is the exudation from the *Hevea braziliensis* to which a preservative such as ammonia has been added, and generally contains 25% to 35% rubber. To lessen the cost of transportation, natural latex may be concentrated to 60–70% rubber or to a dry rubber crumb by spray drying. On rubber plantations in the Dutch East Indies and British Malaya a great deal of work has been done on the coagulation of latex with salts and acids in the preparation of the various forms of rubber for the market.

One of the reasons for the wide range over which coagulation takes place in latex seems to be that latex comprises a complex system in which several components play a role in its coagulation, such as enzymes, bacteria, resins, proteins, sugars, tannins, K, Ca, Mg and $PO_4$ ions. In diluted ammonia preserved latex, the coagulation is more rapid than with fresh latex due to several reasons, among which may be mentioned the following: (1) Hydrolytic decomposition of protein products. (2) Formation of protein-ammonia derivatives. (3) Formation of ions when the ammonia is neutralized with acids. (4) Removal of Mg and $PO_4$ ions. (5) Reduction in concentration of the components of the latex. For the diluted latex used in the present process, I have found that coagulation takes place slightly below the isoelectric point of the adsorbed protein sheath. By and large, much experimental evidence substantiates the belief that the coagulation of latex from the first dispersion zone by acids or salts is primarily due to the neutralization of the negative charges of the rubber particles by the adsorption of or combination of the positive ions, and that the hydrogen ion plays the major role.

Many disclosures have been made using rubber with fibers and fiber-like materials and particularly with paper pulp. Within comparatively recent years the rubber used has been generally in the form of ammoniated latex, and the coagulant used quite frequently was aluminum sulfate or paper beater's alum. While aluminum sulfate has proven valuable as a coagulant in making many rubber-paper products, yet with most fibrous materials, aluminum sulfate is not all that is desired due to the fact that the aluminum sulfate or its reaction products affects the natural properties of the rubber, causes deterioration, and retards the vulcanization of the rubber when a vulcanized product is desired.

The contacting of the rubber from the latex with the fibers or fiber-like materials may be done by mixing the aqueous suspension of the fibers and the like with latex and adding a coagulant; or by previously adding a coagulant to the aqueous suspension of fibers and then adding the latex. The fibers may also be formed into a web, then immersed into a bath containing latex and then into a coagulating bath; or the web may be impregnated with the coagulant before immersing into the bath containing the latex. A similar procedure may be followed if the fibers have been woven into a fabric.

In the present application protein fiber materials such as leather or protein-like materials are subjected to the action of a beater or the like. The action of the beater is to disintegrate the materials. Throughout the present specification the term "quasi-fiber" is used to denote this disintegrated condition. I have discovered that adhesion between the rubber and the leather is greatly increased by maintaining on the leather quasi-fibers a charge opposite to the charge on the latex, while at the same time maintaining a degree of acidity (pH) in the pulped leather mass which will bring about the coagulation of the latex. This result is strongly favored by the following which I provide in my process: (1) A cleansed quasi-fiber. (2) A swollen quasi-fiber. (3) An interfacial tension reducer. (4) Improved dispersion.

The cleansed quasi-fibers of leather favor more intimate contact of the leather with the rubber, and at the same time a more uniform contact.

The swollen quasi-fibers of leather give a larger leather surface to contact the rubber.

The interfacial tension reducer increases the probability of contact of leather with rubber and at the same time aids in the closeness of contact of leather and rubber after coagulation.

The improved dispersion in the mass mixture is due to the interfacial tension reducer and to some extent to the protective colloid referred to hereinafter. These substances tend to prevent the formation of aggregates and thereby increase the surface area, and hence the contact surface.

Leather being an ampholyte (amphoteric electrolyte) is electrically neutral with respect to its surrounding medium when the medium is at the "isoelectric point." At other pH values of the medium, the leather will react with the medium: in other words, the isoelectric point of the leather in the medium is the pH of the medium at which reaction between the medium and the leather does not take place, i. e., the point of electrical neutrality, and where a reversal of charges on the leather particles occurs. When the pH of the medium is greater than the isoelectric point of the leather, I have found that the leather becomes negatively charged, whereas if the pH of the medium is less than the isoelectric point of the leather, the leather becomes positively charged.

In the case of collagen, the isoelectric point is about pH 5. Consequently, in the case of vegetable tanned leather, the isoelectric point of the leather is less than pH 5 due to the acidic effect of the vegetable acid used in the tanning process. In the case of chrome tanned leather the isoelectric point is generally greater than pH 5 due predominantly to the effect of the basic chromium compound used in the tanning operation.

Experiments show that the latex particles or globules are surrounded by a protein sheath which causes the latex to exhibit amphoteric properties, and, as in the case of leather, gives to the latex an isoelectric point. Coagulation of the latex begins to take place when the pH of the meduim falls below this isoelectric point which is about pH 4.2 for diluted latex preserved with ammonia. The charge on the latex particles of natural or ammonia preserved latex, as well as special acid latexes having a pH above 4.2, appears to be in all cases negative.

In accordance with my invention, the pH of the aqueous suspension of leather pulp is so controlled as to produce positively charged leather, and is also controlled or kept below the isoelectric point of the latex, the pH of which is such or so controlled that the rubber globules are negatively charged before intermixture of the latex and the leather pulp suspension. These factors effectively contribute to the increased adhesion obtained by my present invention.

In addition to increasing adhesion, I aim to produce uniformity. This I accomplish by pre-treating the leather as well as the compounding materials and adjuncts as hereinafter described, and by the use of interfacial tension reducers hereinafter referred to.

Furthermore, I aim to produce satisfactory cures of the rubber in the finished product by using a very finely divided form of vulcanizing agent, the proper selection of accelerating agents and activators, together with the regulation of the pH of the mass mixture after the coagulation of the latex.

In the process of the present invention, leather scrap is first treated to transform it to a "standard" pulp. In the case of vegetable tanned leather, the following procedure is used. The leather is first cut into very small, elongated pieces which are then placed in a beater machine or the like. Water is then added, and after a short soaking period the beater is set into operation. During the beating process a base such as amonia or sodium bicarbonate is added to the mass in an amount sufficient to raise the pH value slightly above the isoelectric point of the leather as previously determined by a pH determination. In this condition the leather undergoes a mild detan during further beating, which is continued until the leather is completely disintegrated and free of lumps. The water is then removed by draining, thus removing all soluble substances such as ammonium or sodium salts of the acids or acidic substances present in the leather.

As an alternative procedure, the beating process may be continued after the addition of a basic substance such as ammonia or sodium bicarbonate, until the leather is substantially one-half disintegrated as shown by test. Acid is then added until the pH of the aqueous mixture is below the isoelectric point of the leather. The beating process is then carried to completion and the liquid and dissolved materials removed as above. To the wet quasi-fibers which remain, there is added sufficient water to make a freely flowable mass. At this point more acid may be added if necessary to maintain a pH below the isoelectric point of the leather. The beater wheel is then raised and caused to rotate to circulate the mass without further disintegration. The pH of this mass is then determined and sufficient dilute acid, such as sulfuric or formic, is added to bring the pH below the isoelectric point of the latex which is to be subsequently added, as well as below the isoelectric point of the leather. This pulped mass is referred to herein as the "standard pulp."

In the case of chrome tanned leather, the beating process is carried out at a pH which is below the isoelectric point of the chrome leather. For chrome leather shavings the pH of the aqueous mass of which may run as low as 2.5, a base such as sodium bicarbonate is added to raise the pH to a point which is still below the isoelectric point. This gives a mild detanning effect. In the case of finished chrome leather, which generally has a pH of substantially 5 to 6, sufficient acid is added to lower the pH below the isoelectric point of the leather, and the beating continued to completion as above.

Alternatively, for either the chrome leather shavings or the finished chrome leather, 1% to 2% of an alkali metal or titanium salt of an organic acid may be added and the beating continued to completion. For any of the procedures of chrome leather after the beating is completed, the liquid and dissolved materials are then removed as outlined above. After the draining off of the water and the addition of fresh water for the formation of a flowable mass, sufficient acid is added if necessary to bring the pH slightly below the isoelectric point of the latex which is later to be added and also below the isoelectric point of the leather.

After the preparation of the standard pulp of either vegetable tanned or chrome tanned leather, it is treated with 0.5% to 5% of an alkylated aryl sulfonate, or selections from sulfuric derivatives of higher alcohols such as cetyl, lauryl, myristyl, stearyl alcohols and the like or mixtures of the same. Sodium sulfonates of amides of higher fatty acids combined with lower aliphatic alcohols, sulfonated products of aldehyde-phenols condensed with higher fatty acids, reaction products of alkyl esters of higher fatty acids with sulfonating and sulfating agents, and reaction products of polyglycerols reacted with higher fatty acids. Any of these compounds or mixtures of the same may be added in solution to the standard pulp and allowed to be adsorbed into the fibers. These compounds act as interfacial tension reducers for the standard pulp and enhance the uniformity of contact of the rubber particles with the quasi-fibers of leather after the coagulation of the latex, as well as with other added materials and the dispersion of the same.

The latex is then prepared for introduction into the standard pulp. A determination is first taken of the basic content of the latex which is then regulated by the addition of formaldehyde or by aeration or other suitable means so that its pH is such that the final pH of the latex-standard-pulp-mixture will be below the isoelectric point of the latex itself.

Prior to the addition of the latex to the standard pulp, compounding materials as well as adjuncts not related to vulcanization are added separately, in groups, or collectively to any or all of the following: to the standard pulp, or the diluted latex, or to the mass mixture after the coagulation of the latex in the pulped leather mass, either before or after the addition of the final neutralizing agent.

As to the compounding materials and adjuncts it will be understood that the vulcanizing, accelerating, and activating agents, as well as the aging inhibitors referred to are given merely as preferred examples.

As a vulcanizing agent I prefer to use a superfine or colloidalized form of sulfur.

With regard to the accelerating agent, selections from the following may be used in addition to the zinc dithiocarbamate referred to hereinafter in the examples: The reaction product of asymmetric dichloracetone and cyclo-pentamethylene dithiocarbamic acid; carbon disulfide derivative of methylene dipiperidine; zinc salt of dibutyl dithiocarbamic acid; zinc salts of oxidized dialkyl dithiocarbamates; zinc methyl, ethyl, isopropyl, butyl, or amyl xanthogenate; oxy-normal-butyl thiocarbonic acid disulfide.

As activating agent, a very finely divided zinc oxide, or with certain accelerators, aryl amines and stearic acid may be used. In the place of zinc oxide, other zinc compounds such as the hydroxide, basic carbonate, laurate, oleate or stearates (fatty acids above butyric) may be used. The zinc derivatives named may be used in conjunction with zinc oxide.

As aging inhibitor, in addition to the aldol-alpha-naphthylamine condensation product, the following may be used: Condensation product of acetone and diphenyl amine or the formaldehyde derivative of the same; phenyl-beta-naphthylamine; reaction product of acetaldehyde-aniline; cyclo-hexyl - alpha - naphthylamine; s - dibeta-naphthyl p-phenylene diamine; diphenyl p-phenylene diamine; mixtures of certain aryl amines.

These compounds are preferably pretreated before being added, the pretreatment consisting of the addition of protective colloids such as gum arabic, ammoniated alginates, esterified starches, gelatin, glue, tragacanth and caragheen moss, which prevent the coagulation of the latex when added to the same. Also a wetting agent is preferably used with these materials.

After the addition of the interfacial tension reducer compound to the standard pulp and after the introduction of the compounding materials and adjunct materials to the prepared latex or standard pulp, the latex is slowly added to the standard pulp. After complete coagulation a base is added in sufficient amount to raise the pH to a value corresponding to substantial neutrality. Or, the compounding materials and adjuncts may be added wholly or partially to the coagulated latex-leather mass mixture, either before or after the addition of the base.

In certain cases it may be desirable to coagulate the binding material or materials in the mass mixture by adding an acidic coagulant after the binding material has been added to the pulped leather mass. In this case, in order to prevent the coagulation of the binding material when added to the pulped leather, the standard pulp is treated with a neutralizing agent until the pH of the mass is near the isoelectric point of the latex. Then a paste of a protective colloid (1% to 3%) is added and the mass homogenized before the addition of the binding material. Or, the paste of protective colloid may be added to the binding material before the binding material is added to the pulped leather mass. When the protective colloid is added as stated above, it will require a greater degree of acidity (a lower pH) to cause the coagulation of the binding material.

The protective colloid not only prevents the coagulation of the binder when added to the pulped leather, but gives better control of the coagulation after the coagulant is added, and prevents the settling of suspensions.

The compounding materials may be treated as hereinafter described, and added directly to the pulped leather mass, or to the diluted latex before it is added to the pulped leather mass, or, to the pulped leather mass and latex after they have been mixed and homogenized, or after the coagulated mass mixture has been treated with a base.

Where vulcanized latex is used instead of unvulcanized latex, the above procedure is followed except the vulcanizing agent, accelerating agent, and activating agent are left out. However, the aging inhibitor is used as in the case of unvulcanized latex. Or, alternately, the standard pulp prepared as herein described and containing a surface tension reducer is adjusted, if necessary, to a pH of 3 to 4. The latex is prepared for addition to the aqueous pulped mass mixture in a manner as described for unvulcanized latex. The aging inhibitor, previously pretreated, is now added to either the adjusted diluted latex or the leather pulp.

The diluted latex is now slowly added to the aqueous leather pulp in such a way as to give rapid mixing while retaining a pH of the mass mixture below 4.2. After the coagulation of the latex, a water emulsion of oil is added and dispersed throughout the mass.

At this point dyes, pretreated pigments, and fillers may be added, and the mass mixture homogenized. A neutralizing agent is then added in sufficient amount to raise the pH of the mass mixture to 4 to 5 with vegetable tanned leather and 5 to 6 with chome tanned leather. The liquids are then removed and the process as herein described followed.

This alternate procedure may be used with vulcanized latex, omitting the compounding materials as stated above.

The following examples describe specific compositions and the process of making them. It is to be understood, however, that the present invention is not restricted to the specific proportions hereinafter set forth which may be varied as desired.

*Example #1.*—To 100 gm. of dry vegetable tanned scrap sole leather previously cut into pieces to pass through ¼ inch mesh and placed in a beater, there is added sufficient water to produce a freely flowing mass. The leather is allowed to soak a few minutes, after which the beater is started and allowed to run for about 10 to 15 minutes. Dilute ammonia is then added until the aqueous mass has a pH of approximately 0.1 above the isoelectric point of the leather as determined by test.

The beating process is continued until the leather is completely disintegrated, this step requiring substantially 2 hours. The liquid portion is then drained from the machine, leaving the wet quasi-fibers to which water is again added to give a freely flowable mass as above. The beater is again started to disperse the suspended leather material, and dilute sulfuric acid is added until the mass has a pH between 3 and 4. The quasi-fibers are now in a cleansed condition, slightly detanned, swollen to give a larger contact surface, and regulated to a known acidity. This aqueous acidified pulped material is hereinafter referred to as the "standard pulp."

To this standard pulp there is added 2 gm. of "Nekal" (sodium salt of alkylnaphthalene sulfonic acid) dissolved in 30 or 40 ml. of water, which acts as an interfacial tension reducer, and is uniformly dispersed throughout the aqueous standard pulp, and allowed to remain in the pulped mass for substantially 30 to 40 minutes in order that it may reach the interstices of the quasi-fibers.

With the standard pulp prepared as described above, the latex is next prepared by first determining its total basicity, then by aeration reducing the same to contain 0.2% ammonia or less. This latex with the reduced basicity is then diluted with water.

The compounding materials consisting or 0.6 gm. of zinc dimethyl dithiocarbamate as an accelerator, 0.6 gm. of colloidalized sulfur, 0.5 gm. of zinc oxide as activating agent, and 2 gm. of aldol-alpha-naphthylamine as aging inhibitor are uniformly mixed with a wetting agent such as ethanolamine soap and collectively made into a thin paste with water containing a few ml. of ammonia, and a small amount of casein. This paste is then homogenized and the particle sizes reduced by placing in a ball mill, or by running the same through a regulated colloid mill. The thus treated compounding materials may now be added to the diluted latex.

The aqueous acidified pulp (standard pulp) containing the interfacial tension reducer which has been uniformly distributed through the liquid and quasi-fibers, is next placed in a large container with a rotating wheel for homogenizing without disintegration.

The diluted componded latex is slowly added to the standard pulp and in such a manner that there is rapid dispersion of the same in the mass. With the degree of acidity at the pH as stated, coagulation will occur and the coagulated latex will firmly adhere to the positively charged leather.

After the completion of the coagulation of the latex, 10 gm. of sulfonated oil such as neat's-foot, rape seed, castor, fish or hydrogenated fish oils is treated with water to make an emulsion and added to the coagulated mass mixture. This mixture is then circulated for 30 to 40 minutes. A pH of the mass mixture is then taken, and, if necessary, sodium bicarbonate added until it possesses substantial neutrality.

The finished product closely resembles leather, particularly in view of the uniform distribution of the rubber throughout the mass and the strong adherence of the rubber to the leather made possible by the practice of the invention.

*Example #2.*—120 gm. of chrome shavings from which powder-like substances, lumps and any foreign materials have been removed are placed in a beater and water added in sufficient quantity to obtain a freely flowable mass. The mass is best wetted by regulating the beater wheel to circulate the mass without disintegration. After a period of from 15 to 20 minutes the pH of the mass mixture is taken and sodium bicarbonate added in sufficient quantity to impart to this mass mixture a pH of 3 to 5. The beating process is then started and continued until complete as determined by test, after which the liquid is removed and with it all dissolved materials, leaving the quasi-fibers.

Water is again added to obtain a freely flowable mass, and, if necessary, diluted formic acid is added to obtain a pH of the mass mixture of substantially 3 to 4, which acidity is suitable for the diluted treated latex to be added later: i. e., it insures keeping the pH of the leather below the isoelectric point of the fibers throughout and after the intermixing, when the precipitation of the latex on the leather particles takes place, and the negative charges of the latex are neutralized by the positive charges of the leather.

Water soluble materials have now been removed, including any excess acid. The leather has been subjected to a mild detanning and the quasi-fibers are swollen, thus giving a greater surface for the adhesion of the binding material. The quasi-fibers of the leather are in a cleansed condition, thus favoring better adhesion with the binding material, and the acidity has been regulated to a known pH.

The interfacial tension reducer is now added as described in Example 1. The latex is next treated as described in Example #1, which consists in rendering it compatible with the standard chrome tanned leather pulp, diluting the same, adding the pretreated compounding agents to said latex in the same manner as described in Example #1, and observing the same precautions.

The diluted compounded latex is now added to the circulating standard pulp containing the interfacial tension reducer, in such a manner as to favor rapid dispersion of the same in the pulp.

After complete coagulation of the latex in the mass mixture as described, an emulsion of a sulfonated oil is added and dispersed throughout the mass, and the mass circulated for 30 to 40 minutes. At the expiration of this time, a neutralizing agent such as sodium bicarbonate is added until the pH is raised to substantial neutrality.

When the process is carried out as described, the mass mixture will have a dirty green color, and if a natural leather color is desired, a dye or mixture of dyes may be added, it being necessary to select such dyes as are not affected by vulcanization. The diazo dyes are particularly suitable for this purpose.

Also, pigment or filler materials, or materials intended to impart certain properties may be added at this point in the process.

While the present process has been described with respect to specific amounts of materials to be used in a batch process, it is to be understood that the process of the present invention is adapted equally well to a continuous process.

It is also to be understood that aqueous emulsions of synthetic rubber or natural or synthetic resins may be used in conjunction with the negatively charged latex referred to in the application.

Also, that artificial aqueous latices may be used alone or in conjunction with negatively charged latex as a binding material. Moreover, fiber or fiber-like materials may also be blended with the quasi-fibers of leather.

Furthermore, it is also feasible to use natural or synthetic fibers having a protein or protein-like composition in place of or in combination with the leather, provided, however, the natural or synthetic fiber in question has a structure which includes groups which react in a way similar to the amino groups in leather, i. e., reactive-nitrogen containing groups. For this purpose, wool, silk, hair and the like, together with fibers made from protein materials or which by polymerization contain such groups, may be used.

Having thus described my invention, I claim:

1. A process of preparing a mass mixture for making a leather-rubber composition, which process comprises beating a mass of leather-particles with water into a flowable pulpy mixture, said beating taking place while keeping the pH of the aqueous mass on the side of the isoelectric point in which the pH of 5 lies, to partially de-tan the leather; separating the water from the pulpy mixture to cleanse the fiber-particles and remove the ionogens in solution; adding water to the cleansed leather-particles to re-form a flowable mass; adjusting the pH of the aqueous mass so that it is between 3 and 4, to thereby create and maintain positive charges on the leather particles; adding to the positively charged flowable mass a diluted negatively-charged latex which has been regulated to maintain the pH of the resulting mixture at the isoelectric point aforesaid of the flowable mass, during addition of the latex, whereby said latex becomes deposited on the leather-particles.

2. A process of preparing a mass mixture for making a leather-rubber composition, which process comprises beating a mass of vegetable-tanned leather particles with water into a flowable pulpy mixture, while keeping the pH of the mass above the isoelectric point of the vegetable-tanned leather to thereby partially de-tan the leather; separating the water from the pulpy mixture to cleanse the leather particles and remove the ionogens in solution; adding water to the cleansed leather particles to re-form a flowable mass; adjusting the pH of the aqueous medium to between 3 and 4, to thereby create and maintain positive charges on the leather particles; adding to the positively charged aqueous leather flowable mass a diluted negatively-charged latex which has been regulated to maintain the pH of the resulting mixture below the isoelectric point of the leather flowable mass, during addition of the latex, whereby said latex becomes deposited on the vegetable-tanned leather particles.

3. A process of preparing a mass mixture for making a leather-rubber composition, which process comprises beating a mass of chrome-tanned leather particles with water into a flowable pulpy mixture while keeping the pH of the aqueous mass below the isoelectric point, thereby partially de-tanning the leather; separating the water from the pulpy mixture to cleanse the leather particles and remove the ionogens in solution; adding fresh water to the cleansed leather to re-form a flowable mass; adjusting the pH of the aqueous medium so that it is between 3 and 4, to thereby create and maintain positive charges on the leather particles; adding to the positively charged aqueous leather flowable mass, a diluted negatively-charged latex which has been regulated to maintain the pH of the resulting mixture substantially at or slightly below the isoelectric point of the leather flowable mass during the addition of the latex, whereby said latex becomes deposited on the chrome-tanned leather-particles.

WALTER SCOTT.